A. DE GIGLIO.
KINEMATOGRAPHIC APPARATUS UTILIZING THE USUAL PHOTOGRAPHIC FILMS.
APPLICATION FILED MAY 10, 1911.
1,109,575.
Patented Sept. 1, 1914.
2 SHEETS—SHEET 1.
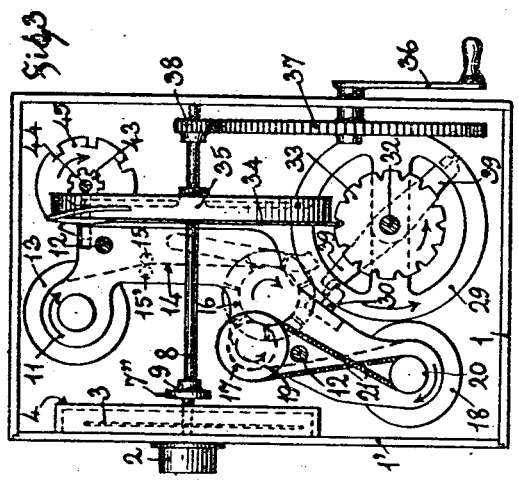
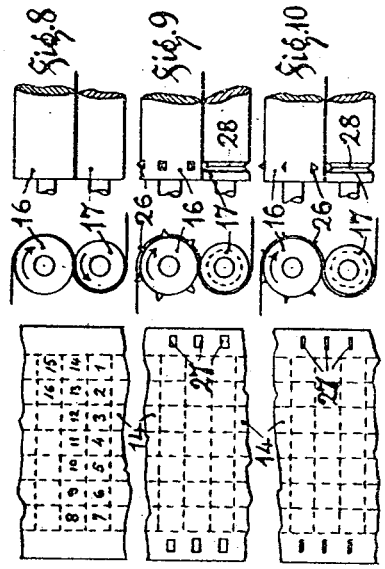
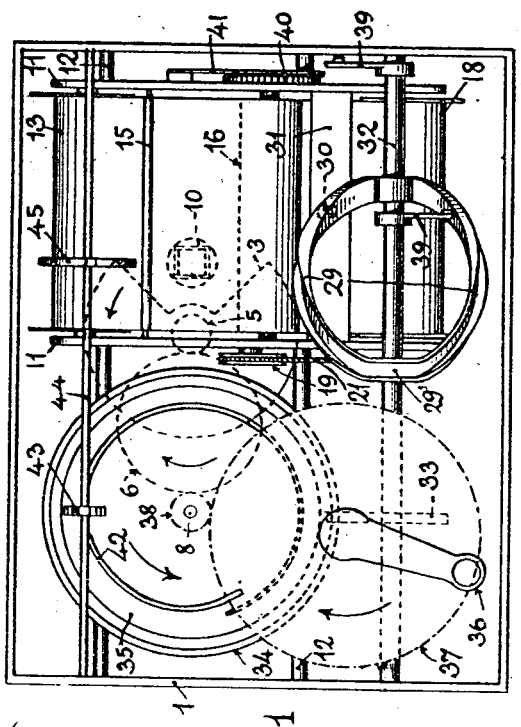
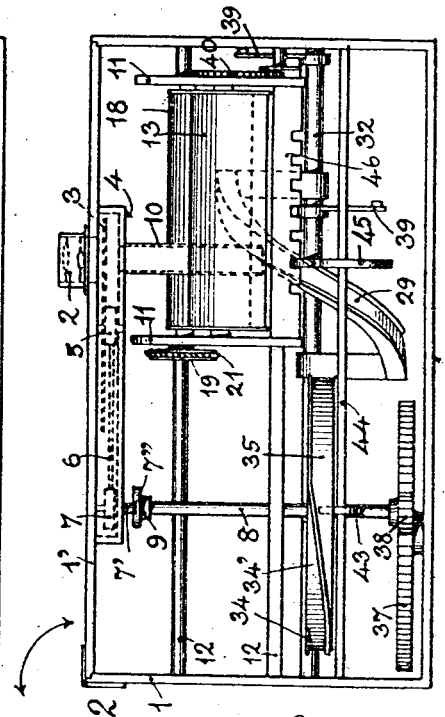
Witnesses:
B. Sommers
Elizabeth Leckert
Inventor:
Alfonso de Giglio,
By Henry Orth
Atty.

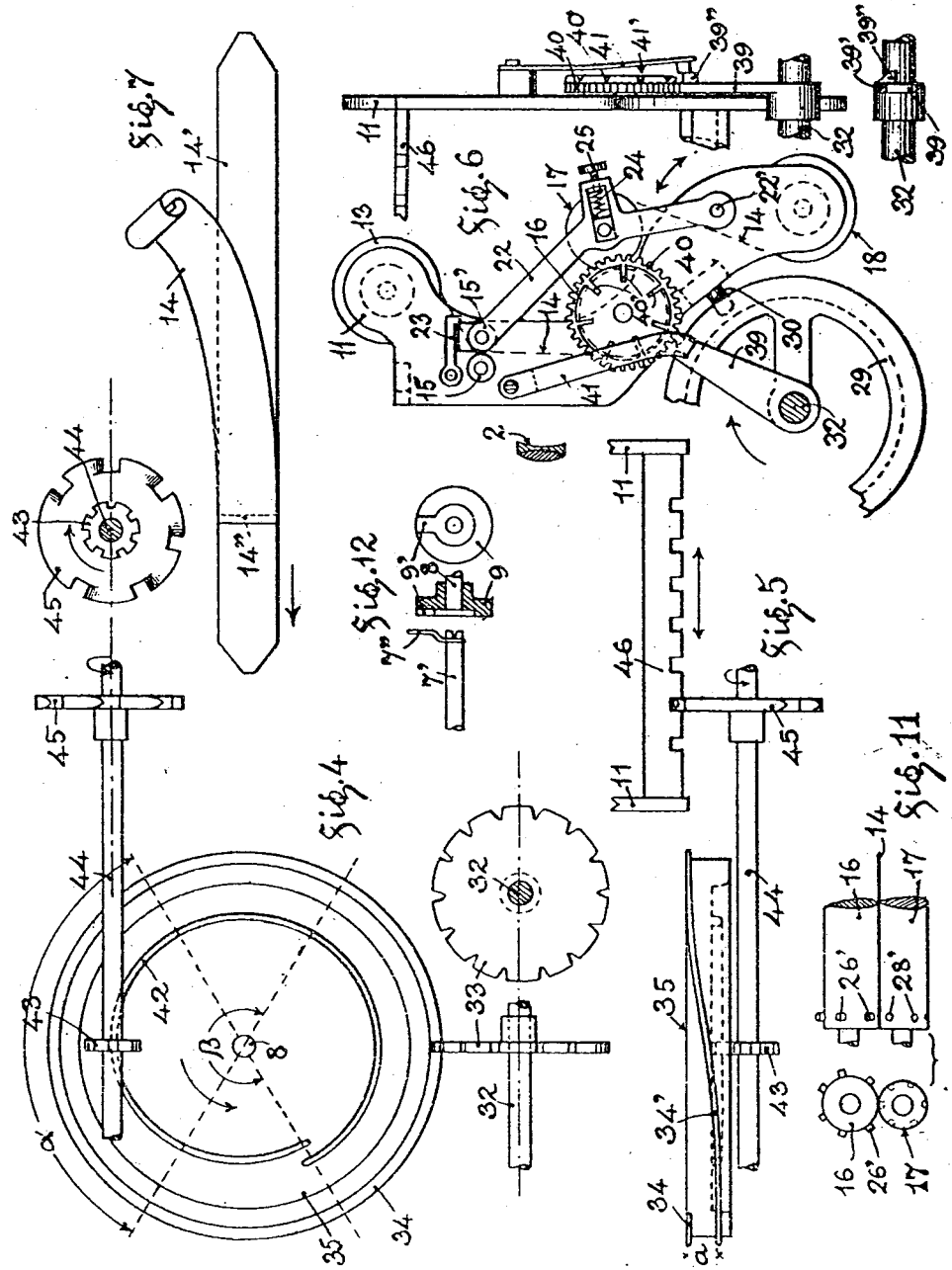

UNITED STATES PATENT OFFICE.

ALFONSO DE GIGLIO, OF COPENHAGEN, DENMARK.

KINEMATOGRAPHIC APPARATUS UTILIZING THE USUAL PHOTOGRAPHIC FILMS.

1,109,575. Specification of Letters Patent. Patented Sept. 1, 1914.

Application filed May 10, 1911. Serial No. 626,233.

*To all whom it may concern:*

Be it known that I, ALFONSO DE GIGLIO, a subject of the King of Italy, residing at Copenhagen, Denmark, have invented certain new and useful Improvements in Kinematographic Apparatus Utilizing the Usual Photographic Films; and I do hereby declare the following to be a full, clear, and exact description of the invention, such as will enable others skilled in the art to which it appertains to make and use the same, reference being had to the accompanying drawings, and to letters or figures of reference marked thereon, which form a part of this specification.

The object of the present invention is an apparatus which renders it possible to employ the usual commercial photographic films for taking kinematographic views, their direct examination, and their projection on a screen. To this end, a double alternating motion is given to the film which is wider than each independent picture; first, an alternating motion in a direction which is perpendicular to the length of the film strip, and second a progressive lengthwise motion. The photograms or individual pictures form thus a succession of parallel rows on the film strip, covering the greater part of its surface, so that the strip presents only two narrow borders which are not covered by the photograms, and a better utilization of the surface of the film strip is thus obtained than with the usual kinematographic films. The impression of the positive films may, moreover, be made in a frame by contact with the negative film, or by causing the two strips to run between two rollers, one of which is driven. This permits one to dispense with the complicated impression apparatus required for making the usual kinematographic positive films. The length of the strip may thus be varied according to the will of the operator, by connecting several of the usual films one after the other. It is, moreover, possible, in the same strip, to remove any number of photograms, to retouch or color them in a particular way, or to have them undergo any other treatment, after which they may again be inserted in the strip. Photograms may also be suppressed to obtain surprise scenes. This apparatus also permits the projection of images on a screen by merely placing a source of light behind the strip and replacing the objective employed in producing the photograms by a suitable objective for projection. A direct examination of the views is also possible by substituting for the objective employed in taking the photograms a suitable lens.

One form of construction of said apparatus has been illustrated, as an example only, in the annexed drawing, in which—

Figures 1, 2 and 3 show the apparatus respectively in rear elevation, in plan, and in end elevation, the casing containing the same having been partially broken away; Figs. 4 and 5 show in detail, respectively, in elevation and in plan the mechanism for controlling the intermittent alternating motion of the carriage for the film. Fig. 6 is a detail showing an upper and side view of the film carriage. Fig. 7 shows the film in perspective. Figs. 8 to 11 show different forms of driving rollers. Fig. 12 is a detail.

The apparatus (Figs. 1 to 3) is inclosed in a casing 1, the hinge-cover 1' of which is provided with an objective 2, behind which operates the shutter 3 inclosed in the casing 4 and set in motion by a set of toothed wheels 5, 6 and 7. The shaft 7' of the wheel 7 receives its motion from the main shaft 8 of the mechanism driving the film carriage through a lug 7'' (see Fig. 12). This lug is fixed on the end of the shaft 7' and engages, when the cover 1' of the casing 1 is closed, the radial slot 9' in a plate 9 secured to the end of shaft 8. A preferably square or rectangular pipe 10 in alinement with the objective extends from the shutter casing 4 to near the film; such a pipe serves to limit each photogram or individual picture.

The carriage bearing the film, which comprises two side plates bolted together, is capable of sliding transversely on fixed rods 12. Between the upper portions of the plates 11 is a movable bobbin or reel 13 carrying the film 14 ready to be exposed, assuming that the apparatus is ready for taking the negatives. This film, as is usual and as shown in Fig. 7, is placed upon or backed by a strip of opaque paper 14' to which the film is glued at one end, 14''. The film 14 and the paper strip, when unwinding from the reel 13 pass between guide rollers 15, 15', thence vertically downward in the focal plane of the projective, thence to the driving rolls 16, 17, respectively, passing between the said rolls, and finally is wound up on the receiving bobbin or reel 18 set in rotation by means of a pulley drive 19, 20 and elastic belt 21, driving the feed roll, which in turn drives the roll 16.

For the purpose of facilitating the mounting of the strip 14, 14′, the roller 15′ and the guide roll 17 may be mounted, for instance, as shown in Fig. 6, between two arms 22, pivoted at 22′ and capable of oscillating with respect to the side plates 11 to which said arms are pivoted. These arms 22 are kept in their operative position by hooks, 23, for instance. For controlling the pressure of driving roll 16 against driven roll 17, which is very important, as will be hereinafter shown, the roll 17 instead of being fixed between the arms 22, is mounted in such a way as to be adjusted toward the roll 16; the adjustable pressure between said two rolls being attained by means of springs 24 and regulating screws 25 for altering the compression of the springs.

When the usual films are used the rolls 16 and 17 may both be entirely cylindrical throughout their length, as shown in detail in Fig. 8. The advance of the film is in such case produced by friction between the two rolls 16 and 17. If, on the contrary, a previously perforated film 14 (Fig. 9) is used, the roll 16 is then fitted at both ends with a rim or sprocket wheel, whose teeth 26 are arranged to engage the edge perforations 27 in the film, and the roll 17 is provided with grooves 28 corresponding in depth to the length of the teeth of said sprocket wheel 26, the advance of the film being in this case produced by the teeth 26. Non-perforated films may also be employed and the perforation thereof effected during their passage through the apparatus. Such perforation may be effected either previously, in the apparatus, and the film subsequently subjected to exposure, or during the exposure itself. In this instance the roll 16 is provided with teeth 26 of such shape as to act as perforating points for perforating the film, (Fig. 10). The teeth 26 may also have the shape of cylindrical projections 26′, as shown in Fig. 11; the pressure roll should, in such case, have corresponding holes 28′ instead of the grooves 28 above mentioned.

The double intermittent motion of the film for obtaining a succession of photograms in parallel rows, is first obtained by a transverse intermittent alternating movement of the carriage carrying the film, and secondly by an intermittent rotary motion of the driving drum. The transverse intermittent alternating motion of the carriage is obtained by means of a cam 29 having two helicoidal closed slots connected by circular portions 29′. A pin 30, which may be fitted with an anti-friction roller, is secured to the cross-bar 31 of the carriage, and engages the slots of cam 29. The cam 29 is keyed on a cross shaft 32 on which is also keyed a notched disk 33 with which an open cam 34 engages, said cam 34 formed by a projecting flange on a disk 35 that is keyed on the main shaft 8. The shaft 8 is set in rotation by means of a crank 36, a gear wheel 37 and a pinion 38. The first portion 34′ corresponding to the angle —β— Fig. 4, of the said open cam is helicoidal; the remaining portion is in a plane normal to the shaft 8; besides, the distance —α— Fig. 5, between the beginning and the end of said cam is equal to the distance between two notches of disks 33. It follows that at every turn of disk 35 fitted with the cam 34 the shaft 32 is angularly displaced corresponding to the distance between two teeth 33, this occurring during the rotation of disk 35 corresponding to angle —β—. During the remaining rotation the shaft 32 remains stationary. When the rotation of the shaft 32 takes place, the cam 29 turns and causes the displacement of the film carriage, following the movement of the cam 29 engaging the pivot 30; such a displacement is equal to the width of a photogram. When the carriage has reached the end of its movement in either direction, and the pivot 30 engages either of the circular portions 29′ of the cam slot, the carriage becomes stationary and then begins again its travel in the opposite direction, and so on. When the carriage has reached the end of its travel, a displacement of the driving drum 16 takes place to an angular extent corresponding to the height of a photogram. Such a displacement is effected by either of the arms 39, mounted diametrically opposite, on the shaft 32. These arms are fitted, at their end, with one or more teeth 39′, Fig. 6, which engage a toothed wheel 40 on the driving drum shaft, and cause the rotation required by the latter. Before causing such rotation, the cam 39″ which is secured to each arm 39 cams a spring 41 from its locking position. This spring 41 has a tooth 41′ engaging one of the radial slots 40′ of the wheel 40 and serves to stop the drum 16 exactly in the required position. The rising of spring 41 before the engagement of the teeth of the arm 39 with the wheel 40 is not absolutely necessary, because the spring 41 may be forced to rise merely through the rotation of the wheel 40.

From the above it is evident that when the carriage is displaced as above specified, the photograms, considering that the shutter is opened every time the carriage stops, are arranged in parallel rows, as shown in Fig. 8, where the successive photograms are marked by successive numbers.

It is evident that, instead of obtaining seven photograms on each row, as shown in Fig. 8, a larger or smaller number may be obtained, according to the width of the films, in connection with which, a suitable shape for the cam 29 must be chosen. It is to be noted here that, for the purpose of establishing, independently from cam 29, the exact position in which to stop the carriage, corresponding to the time required for taking a photogram, a locking device is employed. This locking device is driven by a helicoidal cam, arranged on the back face of disk 35 and engages the teeth of a wheel 43, keyed on the transverse shaft 44, fitted with a notched wheel 45 that coöperates with a rack 46 on the carriage. Every turn of the disk 35 and cam 42 causes the rotation of the wheel 43 a space equal to one tooth, during the rotation of the disk 35 through the angle —β—, while for the remainder of the rotation the wheel 43 remains stationary. Owing to the relative position of the portions —α— and —β— of the cams 34 and 42 and the position of the wheels 33 and 43, it is evident that when the carriage is displaced by the action of the cam 34, the shaft 44 and the wheel 45 remain stationary, while one of the notches of the wheel 45 comes into register with the rack 46 so as to allow the displacement of the carriage. When the displacement of the carriage is finished, the cam 42 displaces the shaft 44 and the body of one of the teeth of the wheel 45 enters between teeth of the rack 46 and exactly fixes the position of the carriage, keeping the latter absolutely immovable during the opening of the shutter. The exact position of the photogram is thus established. The cam 42 may, of course, also be placed at the periphery of disk 35, or elsewhere; likewise the cam 34 may be used both for the motion of the carriage and its locking; in this case the wheel 43 should be placed above the disk 35.

It is to be noted here, that with the herein described apparatus, the well known inconvenience arising from the shortening of the film, both negative and positive, after the chemical treatment is easily avoided, either for direct vision or projection. It is known, in fact, that, after the preparation in the developer bath; washing and drying, the film shortens in such a way that, in the positive film the rows of photograms are nearer one another than in the negative film. To compensate for such shortening, recourse is had, while taking the negative, to a film fixed on paper, the film only being employed for projection. On account of the difference in thickness between the negative and the positive films, there will be, in the passage of the latter through the machine, a diminution of pressure between the driving and pressure drums 16, 17, and the result of this will be a decrease in the adherence between the film and the drums, and consequently a diminution in the length of the film which is drawn between the rolls at every partial rotation of the roll 16. If such a diminution of pressure is not sufficient to compensate for the shortening, the pressure may be still further diminished by loosening the springs 24 by the screws 25. An equivalent compensation may also be obtained by replacing the roll 16, provided with teeth or not, by another roll, with or without teeth, of less diameter so as to have an intermitting travel of the film of the required proportion. It is also possible to compensate for the shortening of the film by mounting the film for taking the negatives as shown in Fig. 6, say, in such a way as to place the paper backing in contact with the driving roll 16, thus leaving the film on the inside. This has the same effect as an increase in the diameter of the roll 16 corresponding to the thickness of the paper. Then in employing in the projection only the positive film, without paper, the same result is attained as if the drum 16 had been reduced in diameter.

From the above it will be evident that this invention is not strictly limited to the exact arrangements heretofore specified and shown in the drawing, but may be modified in accordance with circumstances or the requirements of practice.

I claim—

1. In a kinematograph, a main operating shaft, an auxiliary shaft transverse thereto, means to impart periodic movement to said shaft, a continuous cam carried by said transverse shaft having two helical portions connected by circular portions, and a laterally movable film carriage operated step-by-step by said cam.

2. In a kinematograph, a laterally movable film carriage, a shaft parallel thereto, a cam on said shaft having two helical portions connected by circular portions for operating the carriage, means on said shaft and coöperating means on the carriage brought into operation at each end of the travel of said carriage to feed the film longitudinally.

3. In a kinematograph, the combination with a laterally movable film carriage; of a cam for moving the carriage, means to move the cam step-by-step, and mechanism to lock the carriage after each step and operated by said means.

4. In a kinematograph, a laterally movable film carriage, a shaft parallel thereto, a cam on said shaft having two helical portions connected by circular portions for operating said carriage, a pair of feed rolls on the carriage, a ratchet wheel on one of said rolls, means to lock the ratchet wheel against rotation, a pair of oppositely directed pawl arms on said shaft to engage and actuate said ratchet wheel at each end of the travel of the carriage and means on said arms to unlock said locking means during the engagement of the arms with the ratchet wheels.

5. In a kinematograph, the combination with the film carriage and a guide roll and feed roll thereon; of a frame pivoted to the carriage to swing to and from operative position, a guide roll and a coöperating feed roll mounted in the frame, means in said frame to regulate the pressure of the feed roll against its coöperating roll, and a latch to hold the frame in operative position.

In testimony that I claim the foregoing as my invention, I have signed my name in presence of two subscribing witnesses.

ALFONSO DE GIGLIO.

Witnesses:
AXEL FERMIN,
VALDEMAR CHRISTENSEN.